Figure 1:
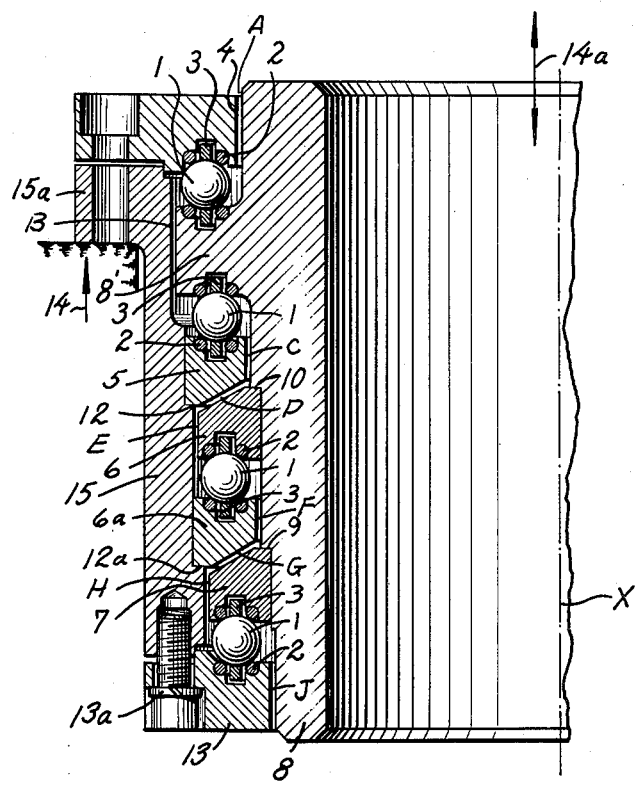

April 17, 1962  H. PÖHLER  3,030,158
SINGLE-AND MULTI-ROW WIRE BEARING SYSTEMS
Filed Dec. 19, 1958  2 Sheets-Sheet 1

INVENTOR
Heinz Pöhler
by: Michael S. Striker
Attorney

United States Patent Office 3,030,158
Patented Apr. 17, 1962

3,030,158
SINGLE- AND MULTI-ROW WIRE
BEARING SYSTEMS
Heinz Pöhler, Westhofen (Ruhr), Germany, assignor to
Eisenwerk Rothe Erde G.m.b.H., Dortmund, Germany
Filed Dec. 19, 1958, Ser. No. 781,780
Claims priority, application Germany Dec. 21, 1957
12 Claims. (Cl. 308—230)

The present invention relates to antifriction bearings in general, and more particularly to improvements in systems comprising thrust bearings of the type in which a plurality of balls travels along and is retained between wire rings. In the following description and claims, such bearings will be called wire bearings or wire-thrust bearings.

Wire-thrust bearings are often utilized in systems wherein two relatively rotatable parts exert very high axial stresses against each other. In known constructions of such type, very high axial stresses are taken up by wire bearings disposed in two or more rows aligned in a plane which is perpendicular to the axis of rotation. The utilization of such multi-row bearings necessarily brings about the disadvantage that the system requires too much space in the horizontal, i.e. radial direction and, therefore, the application of multi-row wire-thrust bearings is often impractical or plain impossible.

An important object of the present invention is to provide a novel system of wire bearings which, while possessing all inherent advantages of aligned multi-row wire-thrust bearing systems, requires considerably less space in the radial direction of relatively rotatable parts between which the bearings are installed.

Another object of the invention is to provide a composite system of wire bearings which is capable of taking up extremely high axial stresses, and which is so constructed that a lubricant introduced therein automatically flows to each component of the composite bearing system.

An additional object of the instant invention is to provide an improved system of wire bearings which is particularly suitable for use in deep-well drilling apparatus.

A further object of my invention is to provide a system consisting of several groups of single- or multi-row wire thrust bearings which is so constructed that the ball guiding and restricting wire rings automatically assume a shape permitting uniform distribution of stresses when the axial loads upon the system increase.

A still further object of the present invention is to provide a system of wire bearings in which certain component parts of the system are so arranged as to enable the centrifugal force to assist in uniform distribution of lubricant when one of the parts between which the bearings are installed is rotated with respect to the other part.

A yet further object of the invention is to provide a system of thrust bearings of the type above set forth in which the axial stresses are uniformly distributed and taken up by each component of the antifriction bearing system regardless of the number of such components.

A concomitant object of my invention is to provide a system of wire bearings which, in addition to very high axial stresses, is capable of taking up considerable moments as well as considerable radial stresses.

A further object of the instant invention is to provide a system of wire bearings which are capable of taking up axial stresses in two directions which are opposed to each other.

The above and certain other objects of the invention are attained by the provision of a system comprising a plurality of axially spaced single-or multi-row wire bearings which are mounted independently of each other between two relatively rotatable unitary (i.e. one-piece) parts, and which are subjected to axially oriented stresses by shoulders or collars formed in or on relatively rotatable parts, whereby the stresses are uniformly divided between the individual wire bearings. In addition, if the system comprises several axially spaced multi-row wire bearings, the bearings in each row are axially staggered, i.e. disposed stepwise at different levels, so that, and assuming that one of the parts between which the bearings are installed is rotatable about a verticle axis, a lubricant introduced into the uppermost row of wire bearings automatically flows to each lower row of bearings and uniformly lubricates the balls in each bearing. Such automatic flow of lubricant may be further assisted by the centrifugal force when the parts rotate with respect to each other if the upper race of each row of wire bearings beneath the uppermost row is formed with an upper surface inclined in a direction opposed to the direction in which the individual wire bearings in each row are axially stagged with respect to each other. The shoulders are formed in stepwise fashion in the outer surface or mantle of the inner relatively rotatable part, and in the inner surface of the outer relatively rotatable part.

Figure 2:
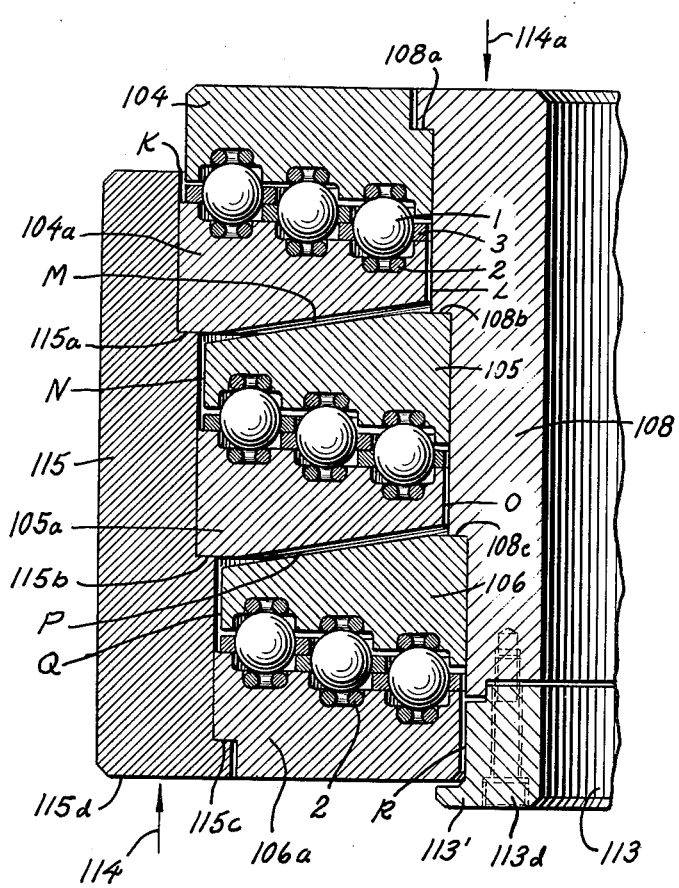

The novel features which are considered as characteristic of the invention are set forth in particular in the appended claims. The invention itselfg, however, both as to its construction and its method of operation, together with additional objects and advantages thereof, will be best understood from the following description of two specific embodiments when read in connection with the acscompanying drawings, in which:

FIG. 1 is an axial section through one half of a three-stage system comprising four single-row wire bearings shown installed in a deep-well drilling apparatus; and FIG. 2 is a similar axial section through approximately one half of a three-stage system comprising three three-row wire bearings for very high axial stresses.

Referring now in greater detail to the drawings, and first to FIG. 1, each single-row wire bearing comprises a plurality of balls 1 which are guided and restricted in their travel by wire rings 2 and are installed in respective cages 3. The system comprises four single-row wire-thrust bearings. As seen from the top to bottom of FIG. 1, the uppermost bearing comprises an upper race or ring 4 and a lower race formed by an external collar 8' of a cylindrical member 8 which latter may receive the rods (not shown) of a deep-well drilling apparatus. The second bearing comprises an upper race formed by the just mentioned collar 8' and a lower race 5. The third bearing comprises an upper race 6 and a lower race 6a; and the lowermost bearing includes an upper race 7 and a lower race or closing ring 13 which latter is rigidly fixed to the underside of an outer cylinder 15 by means of bolts 13a. The balls 1, wire rings 2, cages 3 and reces 5, 6, 6a and 7 may be inspected and/or removed or exchanged upon removal of top ring or race 4, and upon withdrawal of inner cylinder 8 in the direction in dicated by arrow 14. The wire rings 2 are installed in pairs in the upper and lower race of each bearing.

The uppermost bearing comprising races 4 and 8' assumes all upwardly directed stresses transmitted thereto by inner cylinder 8 over its collar 8'. The three lower bearings take up all downwardly directed stresses transmitted thereto by cylinder 8 through collar 8', shoulder 10, and shoulder 9, in that order. Shoulders 10 and 9 act upon the upper races 6, 7, respectively.

The three axially spaced and radially staggered lower bearings transmit stresses to outer cylinder 15 through the latter's shoulders 12, 12a, and through the ring 13 and connecting bolts 13a, in that order. Lower races 5, 6a rest upon shoulders 12, 12a, respectively. The external flange 15a of outer cylinder 15 rests upon a stationary support which latter acts thereagainst with a force operating in the direction indicated by arrow 14. Double arrow 14a indicates the directions in which the inner cylinder 8 may act to transmit axial stresses to the uppermost bearing through collar 8' and to the three lower bearings, respectively, also through its collar 8'.

When the axial stresses are in downward direction, they are equally divided between the three lower bearings because their wire rings 2 become deformed to such an extent as to distribute the stresses between their respective bearings. This arrangement has an additional advantage, namely, the bearings may be of much lighter construction than in heretofore known systems utilized for equivalent axial loads. In the systems of prior construction requiring three single-row wire bearings, all three bearings were disposed in a common radial plane intersecting at right angles the axis of rotation. Thus, quite obviously, the utilization of a system as shown in FIG. 1, in which the single-row wire bearings are axially staggered and independently mounted between two relatively rotatable parts, brings about considerable reduction in dimensions of parts 8, 15, i.e. the diameter of outer part 15 may be considerably smaller. Also, the system of FIG. 1 is capable of taking up not only axial but also considerable radial stresses, as well as very high moments.

A lubricant which is introduced into the space between relatively rotatable parts 8 and 15 through the annular clearance A between the mantle of cylinder 8 and inner surface of ring or race 4 flows into the uppermost bearing and thence through the annular clearance B between elements 8' and 15 into the second wire bearing. From the second bearing, lubricant flows through annular clearance C between elements 8 and 5 into an inclined clearance or slot D between races 5, 6 into annular clearance E between the race 6 and outer cylinder 15 into the third bearing. From the third bearing, lubricant advances automatically through the clearance F between elements 8 and 6a into the inclined clearance or slot G between races 6a, 7 and thence into clearance H between elements 7 and 15 to enter into the lowermost bearing. From the latter, lubricant may escape through the annular slot or clearance J between the lowermost part of cylinder 8 and the adjacent inner surface of bottom ring 13. It will be readily understood that, due to inclination of top surfaces on upper races 6 and 7, centrifugal force will assist continuous flow of lubricant from the upper to lower wire bearings when the inner cylinder 8 rotates about its axis X. Thus, the lubrication of axially staggered wire bearings which, in addition, are arranged stepwise in radial directions of the system, is entirely automatic when the common axis X of relatively rotatable parts 8, 15 is vertical or nearly vertical.

The two uppermost bearings having a common race 8' constitute so-called ball-thrust bearings.

FIG. 2 illustrates a three-stage system in which each stage comprises a three-row wire bearing, and which is capable of taking up very high axial loads acting upon inner cylinder 108 in the direction of arrow 114a. Cylinder 108 transmits stresses to respective upper races 104, 105, 106 through its external shoulders 108a, 108b, 108c in that order. Lower races 104a, 105a and 106a rest upon respective internal shoulders 115a, 115b, 115c of outer cylinder 115. The underside 115d of outer member 115 is acted upon by its support (not shown) with a force operating in the direction of arrow 114.

A flanged ring 113 is connected to the underside of inner cylinder 108 by a series of bolts 113d. The ring 113 whose flange 113' extends over the adjacent underside of lower race 106a is utilized during transportation and when the novel system of wire races is installed, e.g. in a deep-well drilling apparatus or the like. In addition, ring 113 prevents loss of balls 1 when the inner cylinder 108 is withdrawn in upward direction from outer cylinder 115.

It will be noted that the annuli or rows of balls 1 in each of three-row wire bearings shown in FIG. 2 are staggered in the axial direction of relatively rotatable parts 108, 115. Thus, the outermost row in each of the three wire bearings is at a level above the median row, and the latter is at a level higher than that of the innermost row.

A lubricant introduced through the slot K passes through the uppermost bearing, thence through slots or clearances L, M, N into the median bearing, and finally through clearances O, P, Q into the lowermost three-row bearing to be led from the latter through an annular slot R. Again, the upper surfaces of upper races 105, 106 forming part of the median and lowermost bearings, respectively, are inclined with respect to a plane intersecting at right angles the common axis of parts 108, 115, whereby the centrifugal force aids the flow of lubricant from the higher bearings to the bearings therebelow. The direction in which the clearances M and P are inclined with respect to the axes of cylinders 108, 115 is opposed to the direction in which the rows of balls are inclined in each wire bearing, i.e. the lubricant describes a zig-zag course while passing through the vertically spaced wire bearings.

It will be noted that annular clearances K, N and Q are provided between each of upper races 104, 105, 106 and outer part 115; and that the annular clearances L, O, R of reduced diameter are disposed between each of lower races 104a, 105a, 106a and inner part 108. The arrangement of clearances or slots B, E, H and C, F, J in FIG. 1 is analogous. Also, in both illustrations the stepwise arranged shoulders formed in the inner surface of outer part 15 or 115 run in a direction opposed to that of shoulders formed in the outer surface of inner part 8 or 108, i.e. the stepping of relatively rotatable parts is in the opposing directions of their common axis.

By suitable formation of collar 8' and shoulders 9, 10 or shoulders 108a, 108b, 108c, the loads may be substantially equally divided among vertically spaced wire bearings at the time, when the latter are installed between relatively rotatable parts 8, 15 and 108, 115, respectively. Finer adjustments, i.e. a truly equal distribution of axial stresses, may be brought about in a fully automatic way by deformation of wires 2 under increasing axial stresses.

Without further analysis, the foregoing will so fully reveal the gist of the present invention that others can by applying current knowledge readily adapt it for various applications without omitting features that, from the standpoint of prior art, fairly constitute essential characteristics of the generic and specific aspects of this invention and, therefore, such adaptations should and are intended to be comprehended within the meaning and range of equivalence of the following claims.

What is claimed as new and desired to be secured by Letters Patent is:

1. An antifriction bearing system comprising, in combination, a unitary first part having a cylindrical outer surface and a unitary plurality of annular shoulders in said surface; a second part coaxially surrounding said first part, the second part having a cylindrical inner surface and a plurality of annular shoulders in said last mentioned surface, one of said parts being rotatable with respect to the other part; and a plurality of wire-thrust bearings each having an upper race abutting against a shoulder of one of said parts, a lower race abutting against a shoulder of the other of said parts, at least one row of balls between the respective upper and lower races, and wire rings installed in each of said races for guiding and restricting the respective rows of balls for travel therebetween when said part rotates.

2. An antifriction bearing system comprising, in combination, a unitary inner part bounded by a cylindrical outer surface having a vertical axis of symmetry and formed with a plurality of vertically spaced stepwise arranged concentric annular shoulders, each shoulder beneath the uppermost one being progressively closer to said axis; a unitary outer part coaxially surrounding said inner part, the outer part having a cylindrical inner surface formed with a plurality of vertically spaced stepwise arranged shoulders, each said last mentioned shoulder beneath the uppermost one being progressively closer to said axis and one of said parts being rotatable with respect to the other part about said axis; and a plurality of wire-thrust bearings disposed between said parts, each bearing having an upper race abutting against one of said first mentioned shoulders, a lower race abutting against one of said last mentioned shoulders, at least one row of balls between respective upper and lower races, and wire rings in each of said races for guiding and restricting the balls when said one part rotates.

3. An antifriction bearing system comprising, in combination, a unitary inner part bounded by a cylindrical outer surface having a vertical axis of symmetry and formed with a plurality of vertically spaced stepwise arranged shoulders, each shoulder beneath the uppermost one being progressively closer to said axis; a unitary outer part coaxially surrounding said inner part, the outer part having a cylindrical inner surface formed with a plurality of vertically spaced stepwise arranged shoulders, each said last mentioned shoulder beneath the uppermost one being progressively closer to said axis and one of said parts being rotatable with respect to the other part about said axis; and a plurality of wire-thrust bearings disposed between said parts, each bearing having an upper race abutting against one of said first mentioned shoulders, a lower race abutting against one of said last mentioned shoulders, a plurality of vetrically staggered and radially spaced rows of balls between the respective upper and lower races, the rows of balls in each bearing being staggered in the same direction with respect to said axis, and wire rings in each of said races for guiding and restricting the balls when said one part rotates.

4. An antifriction bearing system comprising, in combination, a unitary inner part bounded by a cylindrical outer surface having a vertical axis of symmetry and formed with a plurality of vertically spaced stepwise arranged shoulders, each shoulder beneath the uppermost one being progressively closer to said axis, a unitary outer part coaxially surrounding said inner part, the outer part having a cylindrical inner surface formed with a plurality of vertically spaced stepwise arranged shoulders, each said last mentioned shoulder beneath the uppermost one being progressively closer to said axis and one of said parts being rotatable with respect to the other part about said axis; and a plurality of wire-thrust bearings disposed between said parts, each bearing having an upper race abutting against one of said first mentioned shoulders, a lower race abutting against one of said last mentioned shoulders, a plurality of vertically staggered and radially spaced rows of balls between respective upper and lower races, the rows of balls in each bearing being staggered in the same direction with respect to said axis, and wire rings in each of said races for guiding and restricting the balls when said one part rotates, the upper races of each bearing beneath the uppermost one having upper surfaces inclined with respect to said axis in a direction opposite to the direction in which the rows of said balls are staggered, the races and said parts defining therebetween a zig-zag path consisting of alternating vertical and inclined clearances for the passage of a lubricant from the uppermost bearing to each bearing therebelow.

5. An antifriction bearing system comprising, in combination, a pair of coaxial relatively rotatable unitary parts defining therebetween an annular space and each having a plurality of stepwise arranged shoulders extending into said space in opposite axial directions; and a plurality of wire bearings in said space, each bearing having a first race abutting against a shoulder of one of said parts, a second race abutting against a shoulder of the other part, at least one row of balls between the races of each bearing, and wire rings installed in each race for guiding the respective balls when at least one of said parts rotates.

6. An antifriction bearing system comprising, in combination, a pair of coaxial relatively rotatable unitary parts defining therebetween an annular space and each having a plurality of stepwise arranged shoulders extending into said space in opposite axial directions; and a plurality of wire bearings in said space, each bearing having a first race abutting against a shoulder of one of said parts, a second race abutting against a shoulder of the other part, a plurality of rows of balls between the races of each bearing, the rows of balls in each bearing being axially staggered with respect to each other, and wire rings installed in each race for guiding the respective balls when at least one of said parts rotates.

7. An antifriction bearing system comprising, in combination, a pair of coaxial relatively rotatable unitary parts defining therebetween an annular space and each having a plurality of stepwise arranged shoulders extending into said space in opposite axial directions; and a plurality of wire bearings in said space, each bearing having a first race abutting against a shoulder of one of said parts, a second race abutting against a shoulder of the other part, a plurality of rows of balls between the races of each bearing, the rows of balls in each bearing being axially staggered with respect to each other and the staggering of said rows in each bearing being in the same direction, and wire rings installed in each race for guiding the respective rows of balls when at least one of said parts rotates, the adjacent races having surfaces inclined with respect to the axes of said parts in a direction opposite to that in which said rows of balls are staggered in each bearing.

8. An antifriction bearing system comprising, in combination, a pair of coaxial relatively rotatable unitary parts defining therebetween an annular space and each having a plurality of stepwise arranged shoulders extending into said space in opposite axial directions; and a plurality of wire bearings installed in said space independently of each other; each bearing having a first race abutting against a shoulder of one of said parts, a second race abutting against a shoulder of the other part, at least one row of balls between the races of each bearing, and wire rings installed in each race for guiding the respective balls when at least one of said parts rotates, the material of said wire rings being such that the rings are deformable in response to increasing axial stresses upon said parts.

9. An antifriction bearing system comprising, in combination, a pair of coaxial relatively rotatable unitary parts defining therebetween an annular space and each having a plurality of stepwise arranged shoulders extending into said space in opposite axial directions; and a plurality of wire bearings installed in said space independently of each other, each bearing having a first race abutting against a shoulder of one of said parts, a second race abutting against a shoulder of the other part, at least one row of balls between the races of each bearing, and wire rings installed in each race for guiding the respective balls when at least one of said parts rotates, the material of said wire rings being such that the rings are deformable in response to increasing axial stresses upon said parts, said races and said parts defining therebetween a zig-zag path including vertical and inclined clearances for flow of a lubricant from one outermost bearing through consecutive intermediate bearings and into the other outermost bearing.

10. An antifriction bearing system comprising, in combination, a pair of coaxial relatively rotatable unitary parts defining therebetween an annular space and each having a plurality of stepwise arranged shoulders extending into said space in opposite axial directions; and a plurality of wire bearings installed in said space independently of each other, each bearing having a first race abutting against a shoulder of one of said parts, a second race abutting against a shoulder of the other part, at least one row of balls between the races of each bearing, and wire rings installed in each race for guiding the respective balls when at least one of said parts rotates, the material of said wire rings being such that the rings are deformable in response to increasing axial stresses upon said parts, each said first race defining an annular clearance with one of said parts, each said second race defining an annular clearance with the other of said parts, and the adjacent races of respective bearings having surfaces defining therebetween clearances all enclosing substantially the same angle with the common axis of said parts, said clearances constituting a zig-zag path for the flow of lubricant from one outermost bearing through consecutive intermediate bearings and to the other outermost bearing.

11. An antifriction bearing system comprising, in combination, a pair of coaxial relatively rotatable unitary parts defining therebetween an annular space and each having a plurality of stepwise arranged shoulders extending into said space in opposite axial directions; and a plurality of wire bearings installed independently of each other in said space, each bearing having a first race abutting against a shoulder of one of said parts, a second race abutting against a shoulder of the other part, a plurality of rows of balls between the races of each bearing, the rows of balls in each bearing being axially staggered with respect to each other and the staggering of said rows in each bearing being in the same direction, and wire rings installed in each race for guiding the respective rows of balls when at least one of said parts rotates, the adjacent races of said bearings having surfaces inclined with respect to the axes of said parts in a direction opposite to that in which said rows of balls are staggered in each bearing, said races and said parts defining therebetween a zig-zag path consisting of a plurality of alternating inclined clearances and substantially vertical clearances for the passage of lubricant through each of said bearings and along said inclined surfaces.

12. A ball bearing system comprising, in combination: a unitary first part bounded by a cylindrical outer surface having a vertical axis of symmetry and formed with a pair of annular shoulders; a unitary second part coaxially surrounding said first part, said second part having a cylindrical inner surface and a pair of annular shoulders in said inner surface; and a pair of ball bearing means each disposed between a shoulder of said first part and a shoulder of said second part, said ball bearing means comprising annular members each slightly deformable in response to loads exerted upon one of said parts for uniformly dividing the load between said bearing means, the latter transmitting the uniformly divided loads to the other part.

References Cited in the file of this patent

UNITED STATES PATENTS

| | | |
|---|---|---|
| 1,760,224 | Wray | May 27, 1930 |
| 2,374,820 | Kaye | May 1, 1945 |
| 2,399,847 | Bauersfeld | May 7, 1946 |
| 2,499,651 | Kendrick | Mar. 7, 1950 |
| 2,829,528 | Hulick | Apr. 8, 1958 |

FOREIGN PATENTS

| | | |
|---|---|---|
| 27,465 | Great Britain | of 1911 |
| 517,161 | Germany | Jan. 31, 1931 |
| 786,129 | France | June 3, 1935 |
| 846,646 | Germany | Aug. 14, 1952 |